(12) United States Patent
Tsai et al.

(10) Patent No.: US 7,625,498 B2
(45) Date of Patent: Dec. 1, 2009

(54) LIQUID CRYSTAL COMPOSITE

(75) Inventors: Tsung-Yen Tsai, Hsinchu County (TW); Yuan-Pin Huang, Kaohsiung County (TW); Shau-Wen Lu, Pingtung County (TW); Yun-Min Chang, Taipei (TW)

(73) Assignee: Chung Yuan Christian University, Taoyuan County (TW)

( * ) Notice: Subject to any disclaimer, the term of this patent is extended or adjusted under 35 U.S.C. 154(b) by 410 days.

(21) Appl. No.: 11/509,629

(22) Filed: Aug. 25, 2006

(65) Prior Publication Data

US 2007/0045588 A1 Mar. 1, 2007

(30) Foreign Application Priority Data

Aug. 29, 2005 (TW) .............................. 94129465 A

(51) Int. Cl.
*C09K 19/52* (2006.01)
*C09K 19/54* (2006.01)

(52) U.S. Cl. .............................. 252/299.01; 252/299.5

(58) Field of Classification Search ............ 252/299.01, 252/299.5

See application file for complete search history.

(56) References Cited

U.S. PATENT DOCUMENTS

| 6,928,028 | B2 | 8/2005 | Toda |
| 7,226,966 | B2 * | 6/2007 | Kambe et al. ............... 524/432 |
| 2003/0031438 | A1 * | 2/2003 | Kambe et al. ............... 385/122 |
| 2005/0046782 | A1 | 3/2005 | Kobayashi et al. |
| 2005/0062927 | A1 | 3/2005 | Nakamura et al. |

FOREIGN PATENT DOCUMENTS

JP 2003-268373 A 9/2003

* cited by examiner

*Primary Examiner*—Shean C Wu
(74) *Attorney, Agent, or Firm*—Muncy, Geissler, Olds & Lowe, PLLC

(57) ABSTRACT

The invention provides liquid crystal composites including a liquid crystal with a layered inorganic material and a photosensitive polymer dispersed therein. The layered inorganic layer reduces threshold voltage and enhances grating diffraction efficiency of the liquid crystal. The invention also provides a liquid crystal with a layered inorganic material dispersed in the liquid crystal, and a modified layered material MgAl—K2 LDH.

11 Claims, No Drawings

LIQUID CRYSTAL COMPOSITE

BACKGROUND OF THE INVENTION

1. Field of the Invention

The invention relates to liquid crystal composites, and in particular to a layered inorganic material utilized to improve liquid crystal physical and optical properties.

2. Description of the Related Art

In 1968, RCA disclosed first liquid crystal display (LCD) and initiated a new display era. Several LCD modes as thin-film transistor (TFT), super twisted nematic (STN), and the like were subsequently developed, such that LCD is applied in various fields. Under low driving frequency, the liquid crystal of TFT-LCD is often subject to ionic charge effect, with impact on display properties such as voltage holding ratio, threshold voltage, flicker, image sticking effect, and the like.

Upon application of voltage, the ion charge effect of the liquid crystal layer may originated from impurities or the liquid crystal layer itself. If the ion exchange charges are well distributed in the liquid crystal layer upon application of voltage, the ion charges accumulate in the interface of the liquid crystal layer and the alignment layer (the electricity of the liquid crystal layer opposite to that of the alignment layer). The different electric double layers (EBLs) are formed due to the different distribution areas of the positive/negative charges, thereby reducing or even cancelling the voltage applied to the liquid crystal layer. When voltage is cancelled, the electric field of the EBLs cannot dissipate, and the ion charges reverse to well distribution. Before the ion charges are distributed, the pressure sensed by liquid crystal layer is provided by the ion charges accumulated in the interface of the liquid crystal layer and the alignment layer, and the pressure will decay to zero with time. Because the equivalent voltage of the liquid crystal layer depends on the equivalent field of the EBLs, it is important to reduce ion charge effect of the liquid crystal device in this field.

In 1948 Gabor performed basic experiments in wavefront reconstruction (then called "holography"), with application extending to data reservoirs and related fields. Current research in wavefront reconstruction focuses on storage materials and read/write technology, having evolved from static mode to real time, dynamic, volume, and integral modes. Various storage mechanisms have been developed in holography multiplexing, such as angular multiplexing, wavelength multiplexing, shifting multiplexing, orthogonal phase multiplexing, and random multiplexing. Related applications are widely used in 3D image reconstruction, image collection searches, space and time filters, and holographic optical elements.

Although photorefractive effect of inorganic crystals has a high response rate, no photovoltaic effect, and high two wave-mixing photo energy gain; it is difficult to apply the inorganic crystals in everyday use because the inorganic crystal growth is difficult and expensive.

In 1990, photorefractive effect of organic materials was observed, generating research into application of organic materials in holography optical storage. Preferred organic materials may be polymer dispersed liquid crystals (PDLC), and more preferably photo-sensitive polymers. Due to advantages such as greater dynamic range of index of refraction, simplified process, composition variation, and less costly row materials, the photo-sensitive polymers have become popular holography optical materials. The related devices are important for improving optical grating diffractive efficiency.

In 1998, Kawasumi et al dispersed modified clays in a bi-stable liquid crystal. Upon application of voltage to the bi-stable liquid crystal, the viscosity of the modified clay stabilizes the liquid crystal by delaying the relaxation time thereof. Note that the bi-stable liquid crystal and organic modified clay is necessary for Kawasumi et al. The invention further adopts natural clay and other layered inorganic materials.

In Japanese Pat. No. JP2003268373, the 0.05-10 wt % clay minerals and organic solvents are dispersed in a cholesterol liquid crystal to serve as a record display media. The liquid crystal composite of the invention excludes organic solvents, and further utilizing nematic and smectic liquid crystals.

In U.S. Pat. No. 6,928,028, the charged particles such as metal oxides are dispersed in a liquid crystal formed between two glass substrates, and the accumulation of the charged particles is controlled by pulse voltage and counter voltage for manufacturing a bi-stable LCD device. Note that U.S. Pat. No. 6,928,028 only discloses metal oxides other than any clay.

In 2004, Vaia et al dispersed modified clays in epoxy resins. According to Clausius-Mossotti principle, the applied voltage polarizes layered clays, with resulting orderly arrangement. After curing, the physical properties of the epoxy resins/clays are direction dependent, thereby proving the ordered arrangement of clays in the epoxy resins. Vaia et al utilizes epoxy resin, and the invention utilizes liquid crystals, respectively.

In U.S. Pat. Application No. 20050046782, 1 nm-50 nm inorganic oxides are coated on the glass substrates of a ferro-magnetic or anti-ferromagnetic liquid crystal cell. The inorganic oxides can adsorb the free ions of the liquid crystal to reduce threshold voltage and retain voltage. U.S. Pat. Application No. 20050046782 utilizes inorganic oxides, and the invention utilizes other inorganic materials.

In U.S. Pat. Application No. 20050062927, $C_{60}$ (of about 5 wt %) is dispersed in liquid crystal, thereby enhancing the light transmittance, response speed, contrast ratio, and view angle. Note that the $C_{60}$ is an expensive material.

In 2005, Higgins et al disclosed a new method for controlling PDLC micro-drops, utilizing an optical microscope to determine the properties and manners of the micro-drops. The response time of the drops can be determined by the micro-drops rotation induced by electric field. Note that there is no material dispersed in the PDLC of Higgins et al.

Accordingly, a layered inorganic material dispersed in liquid crystal for improved optical grating diffractive efficiency is called for.

BRIEF SUMMARY OF THE INVENTION

The invention provides a liquid crystal composite, comprising: a liquid crystal; a photo-sensitive polymer; and a layered inorganic material; wherein the photo-sensitive polymer and layered inorganic material are dispersed in the liquid crystal. The layered inorganic materials capture ion charges of the liquid crystal, reducing threshold voltage, and normalizing liquid crystal orientation. The layered inorganic materials can serve as a nucleating agent, such that the liquid crystal and the polymer form bigger micro-drops due to phase separation from polarity difference thereof. The bigger micro-drops are easier oriented by external optical field to get higher optical grating diffractive efficiency.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a liquid crystal composite and method for manufacturing the same, in which a layered inorganic material of less than 5 μm, preferably 10 nm to 1 μm, is added to a nematic, smectic, or cholesterol liquid crystal and stirred, such that the isotropic liquid crystal is further intercalated or swelled into the layered inorganic material. The layered inorganic material is further dispersed by sequential supersonic vibration. The layered inorganic material can be, but is not limited to, metal sulfides, metal phosphates, layered double hydroxides, natural clays, or modified clays. The weight ratio of the layered inorganic material to the liquid crystal composite is less than 10%, preferably about 0.1% to about 7%. After dispersal, the liquid crystal composite is processed by measurement of voltage and capacity to light transmittance, transient current, and photorefractivity.

In measuring voltage and capacity to light transmittance, when the light transmittance of the liquid crystal composite decays to 90% of initiated light transmittance, the applied voltage is defined as a threshold voltage $V_{th}$ of the liquid crystal. The measurement shows that the $V_{th}$ of a pure liquid crystal exceeds 3V, and the $V_{th}$ of the liquid crystal composite of the invention is about 1.5V to 2.5V, indicating that the layered inorganic material dispersed in liquid crystal can reduce the threshold voltage $V_{th}$.

After measurement by a transient current measuring device, the transient current of the liquid crystal composite can be integrated to acquire the total charge density thereof. The total charge density increases corresponding to the applied voltage until the voltage achieves a characteristic value $V_0$. When the applied voltage exceeds $V_0$, the charge density is a saturation charge $Q_s$. The measurement shows that the $Q_s$ of a pure liquid crystal is 300 nC/cm$^{-2}$, and the $Q_s$ of the liquid crystal composite of the invention is reduced to 20 nC/cm$^{-2}$.

The measurements show that the ion charges of the liquid crystal can be reduced efficiently by dispersal of an appropriate amount of layered inorganic materials. In addition to capturing the ion charges, the layered inorganic materials also form an induced dipole which spins according to the applied electrical field, thereby reducing shielding effect, ion charges residual effect, response time, driving voltage, and image sticking of the liquid crystal. More specifically in the transient current, the $Q_s$ of a liquid crystal composite dispersed with layered inorganic materials is dramatically reduced to $1/15 Q_s$ of the pure liquid crystal.

The photorefractive property of the pure liquid crystal is less than 5%, and that of the liquid crystal composite of the invention exceeds 5%, preferably 7% to 60%. The layered inorganic materials capture and adsorb the ion charges to form a bi-stable structure in the space field, such that the internal electrical field and the director axis distribution of the liquid crystal are controlled by the bi-stable structure. The photorefractive properties of the liquid crystal material is modified, such that, as ion charges of the liquid crystal are captured by the layered inorganic materials, liquid crystal molecules are arranged correspondingly, horizontal to the optical field. When forming grating gradually, the diffractive efficiency of the liquid crystal composite is correspondingly enhanced, as the layered inorganic materials stabilize the grating. The diffractive efficiency of the liquid crystal is reduced to about 3%, however, if the layered inorganic material is dispersed more than 5%. This reduction is from the aggregation of the high concentration layered inorganic material, and the liquid crystal is difficult to spin under the applied electrical field.

The invention provides another polymer dispersed liquid crystal composite and method for manufacturing the same, in which a layered inorganic material of less than 5 μm, preferably 10 nm to 1 μm, is added to a polymer precursor and mixed. The mixture is added to nematic, smectic, or cholesterol liquid crystal, and charged into a liquid crystal cell to measure photorefractivity. The layered inorganic material can be, but is not limited to, metal sulfides, metal phosphates, layered double hydroxides, natural clays, or modified clays. The weight ratio of the layered inorganic material to the liquid crystal composite is less than 10%, preferred about 0.1% to about 7%. The suitable polymer precursor is preferably a mixture of penta-functional photocurable acrylic resin, photo initiator, co-initiator, and diluter.

Measurement shows that the optical grating diffractive efficiency of the PDLC is less than 3%, and that of the PDLC dispersed with the layered inorganic materials exceeds 3%, preferably about 4% to 60%. The layered inorganic materials can serve as a nucleating agent, such that the PDLC forms larger micro-drops and reduces anchoring energy of the interface. The larger micro-drops are more easily oriented by external optical field to improve optical grating diffractive efficiency. The permanent holographic grating can be formed by laser diffraction and further proved by an atomic force microscope (AFM), such that the liquid crystal composite of the invention is a suitable media for recording the holographic signal.

EXAMPLES

Example 1

Manufacture of the Nematic Liquid Crystal Composite

Nematic liquid crystal E7 (from Merck) was charged in a reactor and heated to about 90° C. The layered inorganic material was then added, and the mixture stirred over 2 hours. The layered inorganic material was a natural clay PK-802 (montmorillonite) of less than 5 μm, preferably 10 nm to 1 μm. The isotropic liquid crystal was swelled and intercalated into the layered inorganic materials by stirring and sequential supersonic vibration. Note that the weight ratio of the layered inorganic material to the liquid crystal composite was less than 3%.

In measurement of voltage and capacity to light transmittance, the pure nematic liquid crystal and the composite were set in liquid crystal cells, respectively. The liquid crystal cell was operated to normally white status between two orthogonal polarizers. The liquid crystal cell had two transparent substrates separated by about 30 μm. The ITO was coated on the transparent substrates to be transparent electrodes, and an alignment agent (polyimide, PI) was coated on the transparent electrodes to align the long axis of the liquid crystal horizontal to the transparent substrate surface. A light source of He Ne laser (632.8 nm) was applied to the liquid crystal driven at different voltages from a computer-controlled power supply. The relationship between light transmittance, voltage, and capacity of the liquid crystal was recorded by "Optical Meter" and "LCZ Meter" and further analyzed. The experimental data shows that the driving voltage of the pure nematic liquid crystal was about 3V to 4V, and that of the nematic liquid crystal composite about 1.5V.

The transient current of the liquid crystal cell was then measured by applying various voltages between 0 to 10V with interval of 0.5V. The liquid crystal cell was directly connected to an additional resist (about 1 MΩ) to measure the transient dark current. The dropout voltage of the additional resist was detected by a digital oscilloscope, further divided by the resistance of the additional resist to acquire transient dark current value. The transient dark current-time slope was integrated to obtain total charge density. The total charge density increased corresponding to the applied voltage V until V achieving a characteristic value $V_0$. When the applied voltage exceeded $V_0$, the charge density was a saturation charge $Q_s$. The charge to voltage is shown in the formula: $Q(V)=A[1-\exp(-V/V_0)]$, wherein A is a fitting parameter with a determination value $r^2$ exceeding 0.96. The measurement shows that the $Q_s$ of a pure nematic liquid crystal was 300 nC/cm$^{-2}$, and the $Q_s$ of the nematic liquid crystal composite was reduced to about 20 nC/cm$^{-2}$.

The photorefractive property of the nematic liquid crystal composite was measured by two coherent argon ion laser beams (514.5 nm) utilizing a polarizing beam splitter (PBS). The optical electrical field of the laser beam transmitting the PBS was horizontally polarized (p-polarized or TM polarized). The optical electrical field of the laser beam reflected from the PBS was tuned by a half waveplate to be horizontally polarized, such that the optical electrical fields of the two beams were both TM polarized. First, the two beams were checked to be p-polarized by a polarizer and tuned to a required intensity. Second, a direct current and a probe beam were applied for about 1.5 to 2 minutes until stable and a driving beam was then applied, wherein the power change in the two beams was recorded simultaneously. The interval between measurements was at least 3 to 5 minutes, such that the liquid crystal returned to the state before measurement. The measurement shows that the steady state diffractive efficiency of the pure nematic liquid crystal was less than 5%, and that of the nematic liquid crystal composite was about 10% to 60%.

Example 2

Manufacture of the Polymer Dispersed Liquid Crystal Composite

A polymer precursor including penta-functional photocurable acrylic resin (SR-399 from Sartomer), photo initiator (RB, 0.83 wt %), co-initiator (NPG, 0.883 wt %), and diluter (NVP, 13.83 wt %) was added to a layered inorganic material (less than 1 wt % of the PDLC) and then stirred for 6 hours at room temperature. The layered inorganic material was natural clay PK-802 (montmorillonite) of less than 5 μm, preferably 10 nm to 1 μm. After stirring, the mixture was added to a nematic liquid crystal such as E7 from Merck, and then stirred for another 48 hours to produce a PDLC precursor solution. The liquid crystal cell of Example 1 was heated to 60° C. and injected with the PDLC precursor solution by capillary action.

Similar to Example 1, the photorefractive property of the nematic liquid crystal composite was measured by two coherent argon ion laser beams (514.5 nm) utilizing a polarize beam splitter (PBS). The measurement shows that the steady state diffractive efficiency of the pure nematic liquid crystal was less than 3%, and that of the nematic liquid crystal composite was about 12%.

Example 3

Manufacture of Modified Clay

First, a layered double hydroxide (MgAl—K2 LDH) of a formula: $[M^{2+}_{(1-x)}M^{3+}_x(OH)_2]^{x+}A^{n-}_{x/n} \cdot mH_2O$ was prepared by co-precipitation and hydrothermal methods according to Chem. Mater. 14, 4286 (2002) as below. $M^{2+}$ and $M^{3+}$ were divalent or trivalent metal cations such as $Mg^{2+}$ and $Al^{3+}$, respectively. $A^{n-}$ was an anion such as $CO_3^{2-}$, $SO_4^{2-}$, or $NO_3^-$. 2.4 g NaOH was dissolved in 30 ml de-ionic water, and then 9.15 g surface active agent Amphoterge K2 (from LONZA) was added to the NaOH solution. 3.85 g of $Mg(NO_3)_2 \cdot 6H_2O$ and 2.82 g $Al(NO_3)_3 \cdot 6H_2O$ were mixed in 30 ml de-ionic water. The nitric solution and the basic solution were simultaneously added to colloid mill and rotated at 1000 rpm to mix for 2 minutes nucleation. The resulting slurry was then removed from the colloid mill and aged at 100° C. for 24 hours. The final precipitate was washed five times with de-ionic water and dried under vacuum for 24 hours to obtain the MgAl—K2 LDH. The MgAl—K2 LDH and a photo-sensitive polymer were further dispersed in a liquid crystal to form the polymer dispersed liquid crystal (PDLC).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal composite, comprising:
   a liquid crystal;
   a photo-sensitive polymer; and
   a layered inorganic material;
   wherein the photo-sensitive polymer and layered inorganic material are dispersed in the liquid crystal;
   wherein the liquid crystal composite has a diffraction efficiency of 3% to 60%.

2. The liquid crystal composite as claimed in claim 1, wherein the layered inorganic material comprises metal sulfides, metal phosphates, layered double hydroxides, natural clays, or modified clays.

3. The liquid crystal composite as claimed in claim 1, wherein the liquid crystal comprises nematic liquid crystal, smectic liquid crystal, or cholesteric liquid crystal.

4. The liquid crystal composite as claimed in claim 2, wherein the natural clay is sniectite clay, vermiculite, halloysite, sericite, or mica.

5. The liquid crystal composite as claimed in claim 1, wherein the photo-sensitive polymer comprises photocurable acrylic resin.

6. The liquid crystal composite as claimed in claim 5, wherein the photocurable acrylic resin comprises penta-functional photocurable acrylic resin.

7. The liquid crystal composite as claimed in claim 1, wherein the layered inorganic material is less than 5 μm.

8. The liquid crystal composite as claimed in claim 1, wherein the layered inorganic material is about 10 nm to 1 μm.

9. The liquid crystal composite as claimed in claim 1, wherein the weight ratio of the layered inorganic material to the liquid crystal composite is less than 10%.

10. The liquid crystal composite as claimed in claim 1, wherein the weight ratio of the layered inorganic material to the liquid crystal composite is 0.1% to 7%.

11. The liquid crystal composite as claimed in claim 1, wherein the liquid crystal composite has a greater diffraction efficiency than a mixture of the liquid crystal and the photosensitive polymer.

* * * * *